Figure 1:
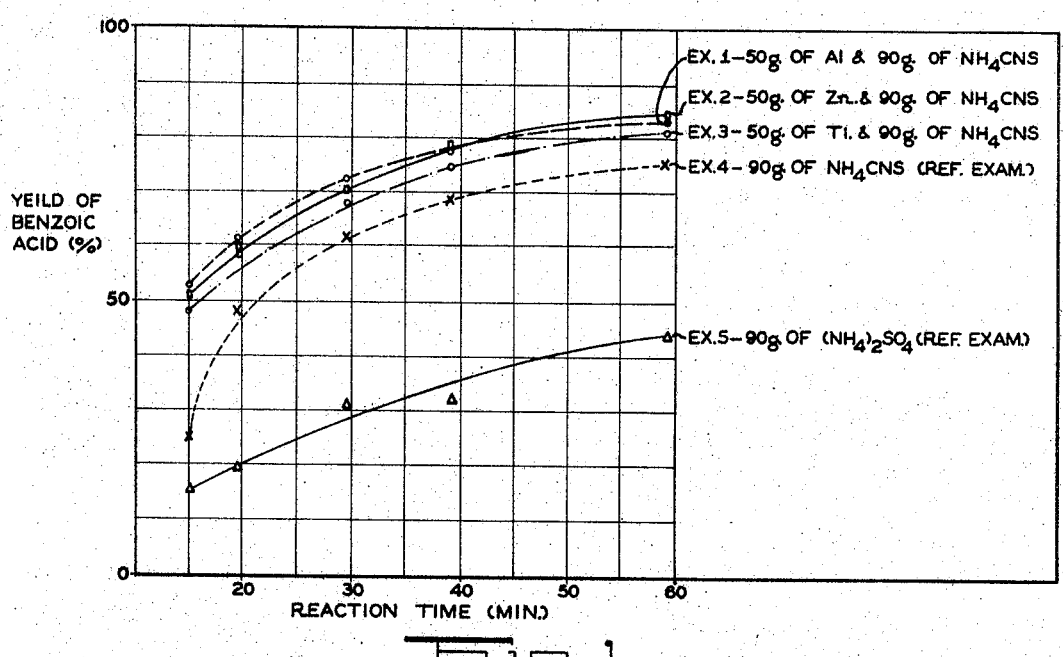

3,336,373
METHOD OF OXIDIZING ORGANIC COMPOUNDS
Zenichi Yoshida, Kyoto-shi, Hiroshi Yanagisawa, Kagawa-ken, and Ryoichi Kori, Tokushima-ken, Japan, assignors to Shikoku Kasei Kogko Company Limited, Kagawa-ken, Japan
Filed Aug. 21, 1964, Ser. No. 391,267
Claims priority, application Japan, Oct. 7, 1963, 38/52,434
21 Claims. (Cl. 260—524)

The present invention relates to improved methods of catalytically oxidizing alkyl substituted aromatic hydrocarbons.

More particularly, the invention provides for catalytically oxidizing alkyl substituted aromatic hydrocarbons by oxidants containing S and water as the major oxidizing components, there being proposed a new and improved method comprising effecting said oxidation under the influence of a metallic catalyst selected from Al, Zn, Ti, Mg, Cd, Sn and like elements belonging to the II, III and IV families of the periodic chart, accompanied or unaccompanied by a further addition of a water soluble inorganic salt selected from the class of $NH_4SCN$ (besides the salt $NH_4SCN$ itself, there may be included for use its composing members $CS_2$ and $NH_3$ in the quantity necessary to form said salt), $(NH_4)_2SO_4$, $(NH_4)_2HPO_4$ and the like.

There have already been made known processes in which air is the oxidant of organic compounds. However, such air oxidation processes involve large amounts of heat since said processes are highly exothermic in nature. Thus, there are many disadvantages inherent therein as enumerated below: in addition to the desired product, several by-products are formed as a result of side reactions which take place; the reaction, as is common with liquid phase reactions, proceeds sluggishly due to the fact that gaseous oxygen is not dissolved into the reaction mixture with sufficiently high speed at the reaction temperature; a considerable quantity of the oxidized product is vaporized and carried away on an escaping fraction of the air which simply flows through the reaction zone without dissolving into the liquid reaction mixture; recovery of a high percentage of said escaping product is impossible without an extremely large recovery system.

Recently there has been proposed a new method of oxidizing organic compounds, which features, for use as oxidants, S, $(NH_4)_2SO_4$, $H_2SO_4$ and other water soluble inorganic sulfur compounds. The latter sulphur oxidation is more advantageous than the other prior art referred to in that the reaction proceeds more selectively thus affording a higher conversion into the desired product and therefore a better yield thereof. It is recognized that terephthalic acid is synthesized particularly advantageously from p-xylene by oxidation according to said sulphur oxidation process. However, it is also true that said sulphur oxidation process which features for use as oxidants, S, sulphates and other inorganic sulphur compounds is effected under conditions pronouncedly more severe than the previously known air oxidation method. Therefore, any attempt to build, on the basis of said sulphur oxidation process, plant of a commercially operable scale is destined to be of little value due to the expense involved.

We have found that members such as Al, Zn, Ti and other elements belonging to the II, III, IV families of the periodic chart of elements uniformly give a pronounced catalytic action enhancing the speed of reaction of said sulphur oxidation processes relative to organic compounds.

The present invention thus provides a useful way of oxidizing alkyl substituted aromatic hydrocarbons, the new technique being particularly advantageous in the synthesis of mono-ring carboxylic acids such as benzoic acid and terephthalic acid from toluene and p-xylene by oxidation.

As indicated above, the present invention features for use as the major oxidant components S and water, the water having a dual function, namely as an oxidant on the one hand and as a diluent on the other hand. However, the combination of S and water, when used by itself, does not enable the water component to effect said dual function. Instead the combination requires the addition of a small amount of a water soluble inorganic salt such as $NH_4SCN$, $(NH_4)_2SO_4$, $(NH_4)_2HPO_4$ and the like, and also the presence of a metallic catalyst such as Al, Zn, Ti and other elements belonging to the II, III and IV families of the periodic chart of elements.

The amount of the oxidant and the catalyst being used differ depending on the kind of organic compounds subjected to oxidation. However, in a typical example shown in the case of oxidizing toluene and xylene for producing the corresponding carboxylic acids, a good result is obtained by using for each mole of COOH radical being produced, material consumptions of the order of 3–5 g. atoms of S, 25–50 moles of water, 0.2–0.5 mole of an inorganic salt selected from the group consisting of $NH_4SCN$, $(NH_4)_2SO_4$, $(NH_4)_2HPO_4$ and the like and 0.2–0.6 g. atoms of a member selected from the class of Al, Zn, Ti and the like.

Besides the above enumerated $NH_4SCN$, $(NH_4)_2SO_4$, and $(NH_4)_2HPO_4$, there are several other kinds of effective salts such as alkali sulphates, alkaline earth sulphates, alkali nitrates, alkali sulphide, ferri or ferro nitrate, nickel nitrite, alkali rhodanates, ammonium vanadate, nickel sulphate, ferri or ferro sulphate. However, compared with all of those last enumerated salts, the previously named $NH_4SCN$, $(NH_4)_2SO_4$, and $(NH_4)_2HPO_4$ prove more effective while $NH_4SCN$ is most effective of all those enumerated. It is also to be noted that $NH_4SCN$ is replaceable by the individual substances $CS_2$ and $NH_4$ in the amounts equivalent to that necessary to produce the first named salt without any change in the performance of said oxidation.

The reaction requires about 1–3 hours for an oxidation level producing yields of the product exceeding 70%, when the oxidant employed is composed of, besides the major components S and water, said water soluble inorganic salt which functions to support the oxidation. However, we have found very surprisingly that when the oxidant referred to above is joined with a catalyst selected from the class of Al, Zn, Ti and other elements belonging to the II, III and IV families of the periodic chart of elements, the reaction time can be as short as about 30 minutes for the same level of yield. This is a feature of the present invention.

According to the sulphur oxidation process discussed above and as disclosed in U.S. Patents Nos. 2,695,313, 2,587,666, 2,722,549, 2,722,547, and 2,722,546 and which features for use as oxidants S and water soluble sulphur compounds, there are also specified as usable oxidants water insoluble inorganic sulphides of the class of ferrous sulphide, aluminum sulphide, and cadmium sulphide. Such metallic sulphides, however, differ basically from the metallic catalyst of the present invention. As a series of experiments has disclosed, when said metallic sulphides of the above patents were used for testing catalytic activity, there was observed no noticeable reduction in reaction time.

The oxidation in the present invention takes place within a temperature range of 120–350° C., and under increased pressure, the pressure rising of its own accord during the reaction, the increased pressure resulting from effecting the reaction in a tightly enclosed pressure vessel at the cited temperature.

Figure 2:
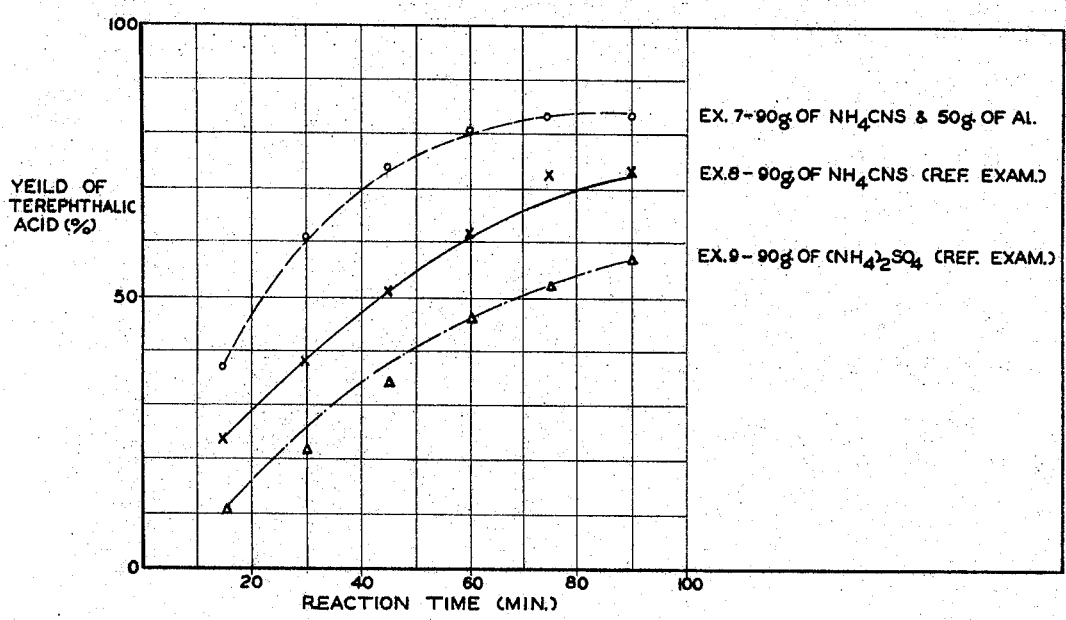

The invention is further illustrated by, but not limited to, the following examples, and the results obtained in said examples are graphically summarized in the appended drawings, in which:

FIGURE 1 summarizes in a chart the results of Examples 1 through 5 inclusive covering the relation between reaction time, the amount of benzoic acid obtained and yield; and FIGURE 2 summarizes the results of Examples 7 through 9 covering the relation between the reaction time, amount of terephthalic acid obtained and yield.

*Example 1*

Into a 5 liter stainless steel autoclave which was equipped with a pressure guage, a temperature guage, a stirring unit and the like, 427 g. (13.35 g. atoms) of S, 2000 g. (111 moles) of water, 90 g. (1.18 moles) of NH$_4$CSN, 50 g. (1.86 g. atoms) of powdered aluminum metal were placed and the autoclave was sealed tight. While stirring was effected, the vessel was heated to a temperature of 335° C. The pressure guage indicated 190 kg./cm.$^2$ at this time. While stirring was continued and the temperature maintained at 335° C., 300 g. (3.26 moles) of toluene were introduced into the autoclave by pumping at a rate of 650 cc./min. To investigate the relation between the duration of time and the conversion of toluene into benzoic acid, the temperature was maintained after introducing toluene at 335° C. for 15 min., 20 min., 30 min., 40 min. and 60 min. Meanwhile the pressure guage indicated a maximum pressure of 240 kg./cm.$^2$. After the lapse of said reaction times, the autoclave was allowed to cool to room temperature. The exhaust valve of the autoclave was opened for the H$_2$S produced within the vessel to be evacuated. The contents of the vessel were discharged, treated with solvent ether to separate the reaction mixture into three different phases; an ether layer, an aqueous layer and a solid residue. The ether layer of such extraction was evaporated for the stripping and recovery of ether, the residue was dissolved in benzene. The benzene solution was treated with a 10% aqueous solution of sodium bicarbonate to transfer the reaction product into the aqueous layer converting the product into sodium benzoate. The last named aqueous solution was acidified with a dilute hydrochloric acid to precipitate benzoic acid, which was filtered off, washed with water and finally dried. The aqueous portion obtained by the original ether extraction was acidified to a pH of 2 by addition of dilute hydrochloric acid and the precipitate which separated was filtered off, and extracted with benzene. The last indicated benzene solution was treated with a 10% aqueous solution of sodium bicarbonate in quite the same manner as the treatment of aforesaid ether layer, and acidified with a dilute hydrochloric acid. Benzoic acid formed therein was filtered off, washed with water, dried, combined with the first crop of benzoic acid obtained from the first mentioned ether layer, and weighed. The benzoic acid thus obtained was proved substantially pure by testing for purity by means of a melting point measurement, elemental analysis and the method of alkali-titration.

The solid residue obtained from the treatment of the ether extraction proved to be a mixture essentially of unreacted S, and a residue of a metallic aluminum catalyst, which after treating with CS$_2$, ether, and dimethyl sulfoxide separated into the S component and the aluminum component for reuse.

The relation between the reaction time, the amount of benzoic acid obtained, and yield was as shown in the following:

| Reaction time (min.) | Amount of benzoic acid obtained (g.) | Yield (percent) |
|---|---|---|
| 60 | 336.4 | 84.5 |
| 40 | 307.3 | 77.2 |
| 30 | 287.8 | 72.3 |
| 20 | 246.0 | 61.8 |
| 15 | 208.6 | 52.4 |

*Example 2*

The same procedure as explained above in Example 1 was effected except that the powdery aluminum metal used as a catalyst was replaced by 50 g. of powdered Zn metal and the relation between reaction time, the amount of benzoic acid obtained and yield was as shown in the following:

| Reaction time (min.) | Amount of benzoic acid obtained (g.) | Yield (percent) |
|---|---|---|
| 60 | 341.2 | 85.7 |
| 40 | 311.7 | 78.3 |
| 30 | 277.9 | 69.8 |
| 20 | 238.9 | 60.0 |
| 15 | 205.0 | 51.5 |

*Example 3*

The same procedure as explained above in Example 1 was effected except that the powdery aluminum metal used as a catalyst was replaced by 50 g. of powdered Ti metal and the relation between the reaction time, the amount of benzoic acid obtained and yield was as shown in the following:

| Reaction time (min.) | Amount of benzoic acid obtained (g.) | Yield (percent) |
|---|---|---|
| 60 | 328.4 | 82.5 |
| 40 | 301.7 | 75.8 |
| 30 | 271.5 | 68.2 |
| 20 | 232.1 | 58.3 |
| 15 | 193.1 | 48.5 |

*Example 4 (Reference example)*

For the purpose of dislosing the catalytic influence of said aluminum, zinc and titanium, the same procedure as explained above in Example 1 was effected, except that all such metallic catalysts were excluded and the relation between the reaction time, the amount of benzoic acid obtained and yield was as shown in the following:

| Reaction time (min.) | Amount of benzoic acid obtained (g.) | Yield (percent) |
|---|---|---|
| 60 | 305.1 | 76.7 |
| 40 | 274.9 | 69.1 |
| 30 | 249.4 | 62.6 |
| 20 | 194.5 | 48.9 |
| 15 | 101.2 | 25.4 |

*Example 5 (Reference example)*

The same procedure as explained above in Example 4 in which the use of metallic catalyst was excluded was effected except that the NH$_4$SCN was replaced by 90 g. of (NH$_4$)$_2$SO$_4$ which is mostly used in the above-mentioned U.S. Patents Nos. 2,695,313; 2,587,666; 2,722,549; 2,722,547; 2,722,546 and the outcome of such experimentals was as shown in the following:

| Reaction time (min.) | Amount of benzoic acid obtained (g.) | Yield (percent) |
|---|---|---|
| 60 | 177.7 | 44.7 |
| 40 | 130.0 | 32.6 |
| 30 | 126.6 | 31.8 |
| 20 | 82.9 | 20.8 |
| 15 | 64.3 | 16.1 |

The values obtained in Examples 1 through 5 inclusive are combined within one chart shown graphically in FIG. 1 of the appended drawings. It will be seen, quite distinctly, that metals of the category of Al, Zn, Ti and the like enhance catalytically the oxidation speed in connection with the oxidation reaction. It will also be seen that greater enhancement of the reaction speed was observed when $NH_4SCN$ was used than when the $(NH_4)_2SO_4$ disclosed in the patents referred to was used.

*Example 6*

The same type of an autoclave as used in Example 1 was used. Held at room temperature, the autoclave was charged with 427 g. of S, 2,000 g. of water, 50 g. of Al, 40.3 g. of $NH_3$ and 85.3 g. of $CS_2$. The amounts so charged of the last named two substances $NH_3$ and $CS_2$ were such that the two substances, in reacting within the autoclave, would produce 90 g. of $NH_4SCN$. Then the autoclave was tightly sealed. While stirring continuously, the temperature within the autoclave was raised to 335° C., and maintained thereat. The autoclave was charged with 300 g. of toluene which was pumped in at the rate of 650 cc./min. After addition of the toluene, the same procedure as explained in Example 1 was effected. The comparison of the relation observed between the reaction time and the amount of benzoic acid obtained and yield disclosed that no difference in the efficiency of reaction was experienced on replacing $NH_4CSN$ with the equivalent of $NH_3$ and $CS_2$. During said experiment the pressure indication rose to 250 kg./cm.² at the highest.

The relation between the reaction time, the amount of benzoic acid obtained and yield was as shown in the following:

| Reaction time (min.) | Amount of benzoic acid obtained (g.) | Yield (percent) |
|---|---|---|
| 60 | 335.0 | 84.0 |
| 40 | 304.1 | 76.5 |
| 30 | 285.8 | 71.8 |
| 20 | 283.2 | 60.0 |
| 15 | 198.2 | 49.8 |

*Example 7*

The same autoclave as that used in Example 1 was charged at room temperature with 393.6 g. of S, 1,836 g. of water, 90 g. of $NH_4SCN$ and 50 g. of powdered Al metal, and was then tightly sealed. While stirring was continuously effected, said autoclave was heated to a temperature of 335° C. The pressure guage indicated 190 kg./cm.² at this time. While said temperature was maintained, the autoclave was charged with 195 g. of p-xylene which was pumped in at the rate of 300 cc./min. After addition of the p-xylene, and with stirring continued, the temperature of 335° C. was maintained for separate periods of 15 min., 30 min., 45 min., 60 min., 75 min. and 90 min., respectively. The autoclave was then cooled to room temperature. The exhaust valve thereof was opened for the $H_2S$ produced in the autoclave to be evacuated. The contents thereof were discharged, and a 10% NaOH aqueous solution was added thereto the solution being heated to take the products of the category of carbonic acid into solution. Said solution was adjusted to a pH of 4 by addition of dilute hydrochloric acid in order to separate the contaminated residual matter composed mostly of S, and then adjusted to a pH of 1–2 to cause the carboxylic acid to precipitate. Said precipitated carboxylic acid was, after separation, washed with ethyl ether for removal of toluic acid and benzoic acid, and the residual terephthalic acid was dried and weighed. The terephthalic acid formed was proved to be substantially pure by testing for purity by elemental analysis and the alkali-titration method.

The relation of the reaction time, the amount of terephthalic acid obtained and yield was as shown in the following:

| Reaction time (min.) | Amount of terephthalic acid obtained (g.) | Yield (percent) |
|---|---|---|
| 90 | 210.5 | 84.6 |
| 75 | 206.4 | 83.0 |
| 60 | 201.8 | 81.0 |
| 45 | 187.0 | 75.2 |
| 30 | 153.0 | 61.5 |
| 15 | 92.8 | 37.3 |

*Example 8 (Reference example)*

Exactly the same procedure as in Example 7 was used except that the powdered Al metal was excluded. In this example, the relation between the reaction time, the amount of terephthalic acid obtained and the yield was as shown in the following:

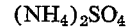

| Reaction time (min.) | Amount of terephthalic acid obtained (g.) | Yield (percent) |
|---|---|---|
| 90 | 182.2 | 73.2 |
| 75 | 180.7 | 72.6 |
| 60 | 154.3 | 62.0 |
| 45 | 128.4 | 51.6 |
| 30 | 93.3 | 37.5 |
| 15 | 59.7 | 24.0 |

*Example 9 (Reference example)*

Exactly the same procedure as in Example 8 was used, the use of the powdered Al metal being excluded, and in addition, $NH_4SCN$ was replaced by 90 g. of $$(NH_4)_2SO_4$$

The relation between the reaction time, the amount of terephthalic acid obtained, and yield was as shown in the following:

| Reaction time (min.) | Amount of terephthalic acid obtained (g.) | Yield (percent) |
|---|---|---|
| 90 | 143.4 | 57.6 |
| 75 | 132.4 | 53.2 |
| 60 | 115.0 | 46.2 |
| 45 | 85.4 | 34.3 |
| 30 | 54.0 | 21.7 |
| 15 | 28.1 | 11.3 |

The values obtained in Examples 7 through 9 inclusive combined within one chart are shown graphically in FIG. 2 of the appended drawings.

Said experimental results are the preferred disclosure of an investigation which, for convenience of explanation, has been limited to the description of catalysts including Al, Zn, and Ti as representative of elements belonging to the II, III and IV families of the Periodic chart of elements. The same level of superiority of performance is confirmed where Mg, Cd, Sn and like metals are used.

As detailed in the above explanation, and as graphically illustrated by FIGS. 1 and 2, the present invention features pronouncedly enhancing the reaction velocity in connection with the oxidation of organic compounds by a composite oxidant having as major components S and water.

Having thus explained particular examples in connection with the present invention,

What we claim is:

1. In a method of oxidizing an alkyl-substituted aromatic hydrocarbon compound by a composite oxidant comprising S and water, the improvement comprising employing with said oxidant a catalyst selected from the group consisting of the elements of the II, III and IV families of the Periodic chart.

2. In a method of oxidizing an alkyl-substituted aromatic hydrocarbon compound by a composite oxidant comprising S and water, the improvement comprising employing with said oxidant a catalyst and an inorganic compound, said catalyst being selected from the group consisting of the elements of the II, III and IV families of the Periodic chart, said inorganic compound being water soluble and selected from the group consisting of $NH_4SCN$, $(NH_4)_2SO_4$, and $(NH_4)_2HPO_4$ and precursors of said inorganic compounds.

3. The improvement as claimed in claim 2, wherein said $NH_4SCN$ is produced in situ by using $CS_2$ and $NH_3$ as starting materials.

4. A method of catalytically oxidizing an alkyl-substituted aromatic hydrocarbon compound, said method comprising charging a pressure tight chamber with 3 to 5 gram-atoms of sulphur, 25 to 30 moles of water and 0.2 to 0.6 gram-atom of a catalyst per mole of alkyl radical to be oxidized, said catalyst being selected from the group consisting of the elements of the II, III and IV families of the Periodic chart, stirring the thusly charged content of said chamber while heating the same to about 120–350° C. whereby an elevated pressure is developed, charging said hydrocarbon compound to be oxidized into said chamber while maintaining the temperature and pressure therein, stirring the compound with the first said contents to react the same, and treating the reaction product to recover the thusly oxidized compound.

5. A method as claimed in claim 4 wherein the hydrocarbon compound is toluene and the oxidized compound is benzoic acid.

6. A method as claimed in claim 4 wherein the hydrocarbon compound is p-xylene and the oxidized compound is terephthalic acid.

7. A method of catalytically oxidizing an alkyl-substituted aromatic hydrocarbon compound, said method comprising charging a pressure tight chamber with 3 to 5 gram-atoms of sulphur, 25 to 30 moles of water, 0.2 to 0.6 gram-atom of a catalyst, said catalyst being selected from the group consisting of the elements of the II, III and IV families of the Periodic chart, and with 0.2 to 0.6 mole of a water soluble inorganic compound per mole of alkyl radical to be oxidized, said inorganic compound being selected from the group consisting of $NH_4SCN$, $(NH_4)_2SO_4$, $(NH_4)_2HPO_4$, and precursors of said inorganic compounds, stirring the thusly charged content of said chamber while heating the same to about 120–350° C. whereby an elevated pressure is developed, charging said hydrocarbon compound to be oxidized into said chamber while maintaining the temperature and pressure therein, stirring the compound with the first said contents to react the same, cooling the reaction product to room temperature and treating the same with a solvent from which is obtained a solid residue, dissolving the residue in a solvent whereby a solution is formed and acidifying the resulting solution to obtain a precipitate, and separating said precipitate.

8. A method of catalytically oxidizing an alkyl-substituted aromatic hydrocarbon compound, said method comprising charging a pressure tight chamber with 3 to 5 gram-atoms of sulphur, 25 to 30 moles of water and 0.2 to 0.6 gram-atom of a catalyst per mole of alkyl radical to be oxidized, said catalyst being selected from the group consisting of the elements of the II, III and IV families of the Periodic chart, stirring the thusly charged content of said chamber while heating the same to about 120–350° C. whereby an elevated pressure is developed, charging said hydrocarbon compound to be oxidized into said chamber, stirring the compound with the first said contents to react the same, and treating the reaction product to recover the thusly oxidized compound.

9. A method as claimed in claim 8 wherein the catalyst is Al.

10. A method as claimed in claim 8 wherein the catalyst is Zn.

11. A method as claimed in claim 8 wherein the catalyst is Ti.

12. A method as claimed in claim 8 wherein the catalyst is Mg.

13. A method as claimed in claim 8 wherein the catalyst is Cd.

14. A method as claimed in claim 8 wherein the catalyst is Sn.

15. A method of catalytically oxidizing an alkyl-substituted aromatic hydrocarbon compound, said method comprising charging a pressure tight chamber with 3 to 5 gram-atoms of sulphur, 25 to 30 moles of water and 0.2 to 0.6 gram-atom of a catalyst per mole of alkyl radical to be oxidized, said catalyst being selected from the group consisting of the elements of the II, III and IV families of the Periodic chart, stirring the thusly charged content of said chamber together with said hydrocarbon compound in said chamber for 1–3 hours while maintaining the temperature at about 120–350° C. whereby an elevated pressure is developed, thereby forming a reaction product, and treating the thusly formed reaction product to recover the oxidized product therefrom.

16. A method as claimed in claim 15 comprising charging into said chamber a water soluble inorganic compound selected from the group consisting of $NH_4SCN$, $(NH_4)_2SO_4$ and $(NH_4)_2HPO_4$ and precursors of said inorganic compounds.

17. A method as claimed in claim 8 wherein the hydrocarbon is stirred with the first said contents for 1–3 hours.

18. A method as claimed in claim 8 wherein said alkyl substituted aromatic hydrocarbon compound is a mono-ring hydrocarbon.

19. A method as claimed in claim 18 wherein the mono-ring hydrocarbon is toluene.

20. A method as claimed in claim 18 wherein the mono-ring hydrocarbon is p-xylene.

21. A method as claimed in claim 8 wherein the elevated pressure is a maximum of 250 kg./cm.$^2$.

References Cited

UNITED STATES PATENTS 2,722,549   11/1955   Toland _____ 260—524

RICHARD K. JACKSON, *Primary Examiner.*

LORRAINE A. WEINBERGER, *Examiner.*

S. B. WILLIAMS, *Assistant Examiner.*